Oct. 15, 1935.   F. J. WINTERSON ET AL   2,017,383
BLIND OFF VALVE
Filed Sept. 10, 1932    2 Sheets-Sheet 1

Frank J. Winterson
Andrew J. Dudley
John Carlstrom
INVENTORS

BY R. J. Dearborn
ATTORNEY

Oct. 15, 1935.  F. J. WINTERSON ET AL  2,017,383
BLIND OFF VALVE
Filed Sept. 10, 1932     2 Sheets-Sheet 2

Frank J. Winterson
Andrew J. Dudley
John Carlstrom
INVENTORS

BY R. J. Dearborn
ATTORNEY

Patented Oct. 15, 1935

2,017,383

UNITED STATES PATENT OFFICE 2,017,383

BLIND OFF VALVE

Frank J. Winterson, Lockport, Ill., and Andrew T. Dudley and John Carlstrom, Port Arthur, Tex., assignors to The Texas Company, New York, N. Y., a corporation of Delaware Application September 10, 1932, Serial No. 632,494

1 Claim. (Cl. 251—91)

Our invention relates to valves and more particularly to a valve for blinding off hot oil lines in which it may be situated, and which will effectively open or close the line while permitting ready and instant determination of the fact that the valve is in its open or closed position.

Our invention has special adaptation in the treatment of hydrocarbon oil, in a system where the oil after being heated is delivered to an expansion drum in which the lighter constituents are vaporized and from which they may be withdrawn, a cokey residue being deposited in the drum. In systems of this kind it is often desirable to use two or more expansion drums so that as each drum is filled with coke it may be shut or blinded off from the remainder of the system and cleaned while the operation is being continued by using the other drum or drums. In cleaning such vessels it is necessary to securely blind off the hot oil charge lines and the vapor lines connecting therewith in order to protect workmen entering the drum and accordingly in the past it has been the practice to provide one or more gate valves in each line which may be operated to close off the line, and as a further precaution, after the line has been closed, to securely block it off by installing a conventional blind flange. In blinding off hot oil lines according to the usual practice there is always danger to workmen of burns due to the necessity of breaking or disconnecting the line to install a blind flange, and it is an object of the invention to provide a valve device for blinding off a pipe line which may be installed permanently in a line and which will be equally as safe, effective and positive in operation as an ordinary blind flange while requiring a minimum of effort in its use.

In carrying out our invention we have provided a housing adapted to be connected or mounted in the pipe line and a rotatable valve in the housing having an opening which, when in the open position, serves to effect a passage through the pipe line and which, when in the closed position, coincides with an opening in the housing so that an operator can look directly through the housing and valve and thus be advised that the valve is closed.

The invention will be better understood by a consideration of the following description and the accompanying drawings in which:

Fig. 2 is a sectional elevation taken on the line 2—2 of Fig. 1, while

Figure 1:
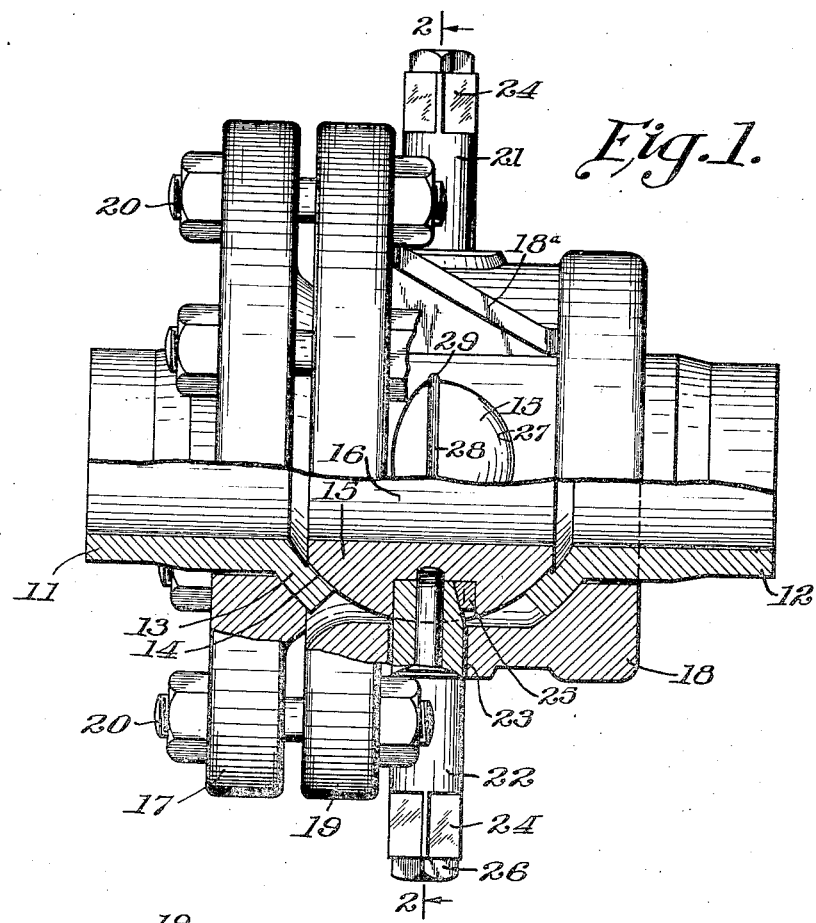
Fig. 1 is an elevation partly in section of a valve constructed in accordance with the invention showing the valve in its open position.
Figure 3:
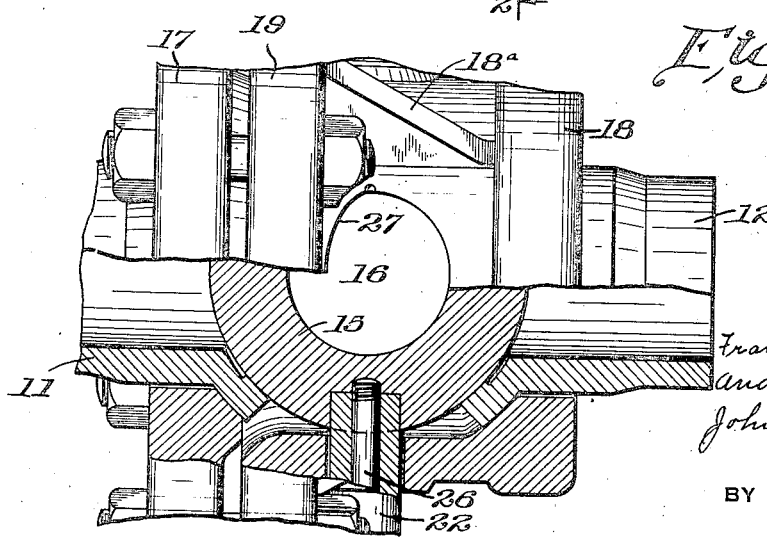
Fig. 3 is a partial section showing the valve in its closed position.
Figure 2:
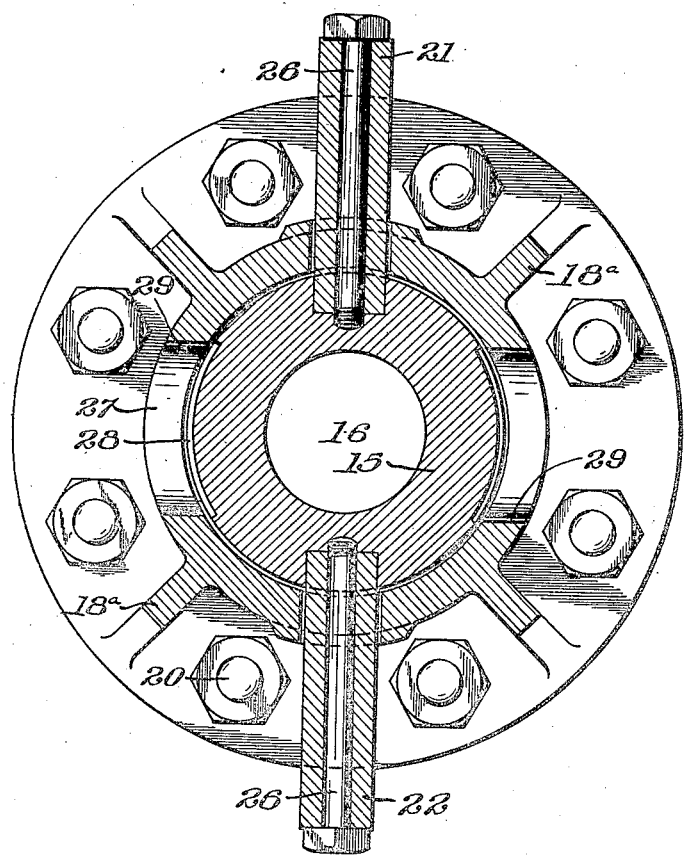

Referring to the drawings, a pair of pipe nipples 11 and 12 are provided which may be secured in any manner to adjoining sections of pipe and which are flared as at 13 to engage the body or housing portion of the valve and machined as at 14 to form spherical seats adapted to engage a ball shaped valve member 15. The valve 15 is provided with an opening 16 bored through the center thereof corresponding in size to the inside diameter of the pipe nipples 11 and 12. The seats 14 are preferably of rather narrow face so as to afford an effective joint with the ball shaped member 15. The body or housing portion of the valve includes a flange member 17 having an opening therein adapted to engage the pipe nipple 11 and a complementary box shaped housing member 18 having an opening therein adapted to engage the pipe nipple 12 and having a flange portion 19 which is secured to the flange member 17 as by a set of bolts 20. The bolts 20 are spaced around the flanges 17 and 19 and are adapted when tightened up to draw the flange member 17 and the box member 18 together and to force the ball member 15 rigidly on its seats 14 in the ends of the pipe nipples 11 and 12. The housing member 18 may be provided with reinforcing fins 18a if desired. The ball shaped member 15 is rotatably positioned in the box shaped member 18 so that when the bolts 20 are loosened it may be given a quarter turn in either direction so that the passage through the opening 16 and the pipe nipples 11 and 12 may be alternately opened and closed. Valve stems 21 and 22 are provided and are rigidly fastened to the ball shaped member 15 and extend through openings 23 in the box shaped member 18. The stems 21 and 22 have squared ends 24 suitable for engagement with a wrench for opening and closing the valve. The valve stems are preferably inserted in countersunk holes formed in the ball member 15 and keyways may be fashioned in the stems and in the ball member to accommodate keys 25 adapted to secure the stems against rotation with respect to the ball member. Holes may be bored lengthwise of the stems to accommodate bolts 26 which are screwed directly into the ball member 15 to secure the stems thereto. Openings 27 are drilled in the wall of the box shaped member 18 to register with the opening 16 in the ball member so that when the valve is fully closed the opening 16 will be exactly in line with the openings 27. To further assist in aligning the opening 16 of the ball member with the pipe nipples 11 and 12, grooves 28 are cut in the ball member 15 adapted to cooperate with corresponding grooves 29 in the box member 18 so that when the valve is fully open the grooves 28 will be exactly in line with the grooves 29.

In assembling the valve as herein shown and described, the pipe nipple 12 is first thrust through the opening in the box member 18 so that the rim of the opening engages the flared portion 13 of the nipple. The ball member 15 may be placed in position within the box shaped member 18 and resting against the pipe nipple 12, and then the stems 21 and 22 may be inserted in the countersunk holes in the ball member 15 together with the keys 25 and secured to the ball member by means of the bolts 26 which are screwed directly into the latter member. The pipe nipple 11 may be thrust through the opening in the flange member 17 so that the rim of the opening engages the flaring portion 13 of the nipple after which the two body portions of the valve may be joined together by adjustment of the bolts 20 to complete the assembly. The pipe nipples 11 and 12 may be secured to adjoining sections of pipe in any suitable manner as by welding or by appropriate fittings.

It will be observed that the valve is so constructed that it may be positively and quickly determined whether it is open or closed and accordingly an operator may open and close the valve with a feeling of certainty that it is fully opened or that it is securely closed. When the valve is open there is a clear passage through the opening 16 in the ball member 15 and the pipe nipples 11 and 12 and at the same time the grooves 28 will register with the grooves 29 as shown in the drawings, Fig. 1. On the other hand when the valve is closed the passage through the opening 16 and the pipe nipples 11 and 12 will be broken and at the same time the opening 16 will register with the openings 27 in the box shaped member 18 so that the operator may see daylight therethrough. Should the operator so desire he may place a bar or rod through the opening 16 and thus make doubly sure that the valve cannot be opened accidentally while he or others may be working in the drum.

Obviously many modifications and variations of the invention, as hereinbefore set forth, may be made without departing from the spirit and scope thereof, and therefore, only such limitations should be imposed as are indicated in the appended claim.

We claim:

A valve device comprising a pair of pipes connected in a pipe line, a valve body comprising a pair of clamping members connecting said pipes each of said clamping members being secured to the end of one of said pipes, a ball valve disposed between said clamping members and having a passage therethrough, seats for said valve in the ends of said pipes, means for rotating said valve, bolts connecting said clamping members and adapted when tightened up to draw the clamping members together and to force said valve rigidly onto its seats, the arrangement being such that the valve may be rotated to open and close the passage through said pipes upon loosening said bolts, and one of said clamping members being provided with a transverse opening opposite the passage in said valve so that an operator can determine when said valve is in its closed position by directly observing said valve passage through said opening.

FRANK J. WINTERSON.
ANDREW T. DUDLEY.
JOHN CARLSTROM.